(12) United States Patent
Yoon (10) Patent No.: US 8,957,633 B2
(45) Date of Patent: Feb. 17, 2015

(54) APPARATUS AND METHOD FOR NON-CONTACT RECHARGING AND NEAR FIELD COMMUNICATION IN A PORTABLE ELECTRONIC DEVICE

(75) Inventor: Jun Yoon, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 349 days.

(21) Appl. No.: 13/588,471

(22) Filed: Aug. 17, 2012

(65) Prior Publication Data

US 2013/0043835 A1 Feb. 21, 2013

(30) Foreign Application Priority Data

Aug. 18, 2011 (KR) .................. 10-2011-0082050

(51) Int. Cl.
*H02J 7/00* (2006.01)
*H04B 5/00* (2006.01)
(52) U.S. Cl.
CPC ............ *H02J 7/0004* (2013.01); *H04B 5/0037* (2013.01)
USPC ........ 320/108; 320/137; 455/41.1; 340/354.8
(58) Field of Classification Search
USPC ................ 320/108, 137; 455/41.1; 340/354.8
See application file for complete search history.

(56) References Cited

U.S. PATENT DOCUMENTS

| | | | |
|---|---|---|---|
| 6,690,259 B2 * | 2/2004 | Aslanidis et al. ............ 340/5.61 |
| 7,912,441 B2 * | 3/2011 | Von Bosch ................. 455/343.1 |
| 7,948,208 B2 * | 5/2011 | Partovi et al. ................. 320/108 |
| 8,228,025 B2 * | 7/2012 | Ho et al. ........................ 320/108 |
| 8,238,823 B2 * | 8/2012 | Maugars et al. ............. 455/41.1 |
| 8,374,546 B2 * | 2/2013 | Maugars et al. ............. 455/41.1 |
| 8,390,249 B2 * | 3/2013 | Walley et al. ................ 320/108 |
| 8,432,293 B2 * | 4/2013 | Symons ..................... 340/854.8 |
| 8,497,658 B2 * | 7/2013 | Von Novak et al. .......... 320/108 |
| 8,502,497 B2 * | 8/2013 | Pijnenburg et al. ........... 320/108 |
| 2006/0145660 A1 * | 7/2006 | Black et al. .................... 320/108 |
| 2008/0188178 A1 * | 8/2008 | Maugars et al. ............. 455/41.1 |
| 2008/0272889 A1 * | 11/2008 | Symons ....................... 340/10.1 |
| 2009/0096413 A1 * | 4/2009 | Partovi et al. ................. 320/108 |
| 2009/0150704 A1 * | 6/2009 | Van Bosch .................... 713/340 |
| 2009/0243397 A1 * | 10/2009 | Cook et al. .................... 307/104 |
| 2010/0181961 A1 * | 7/2010 | Novak et al. .................. 320/108 |
| 2011/0127954 A1 * | 6/2011 | Walley et al. ................. 320/108 |
| 2011/0136550 A1 * | 6/2011 | Maugars ........................ 455/573 |
| 2011/0221385 A1 * | 9/2011 | Partovi et al. ................. 320/101 |
| 2012/0025611 A1 * | 2/2012 | Kamata et al. .................. 307/43 |
| 2012/0235636 A1 * | 9/2012 | Partovi .......................... 320/108 |

FOREIGN PATENT DOCUMENTS

KR         10-0980052 B1       9/2010

* cited by examiner

*Primary Examiner* — Naum B Levin
(74) *Attorney, Agent, or Firm* — Cha & Reiter, LLC.

(57) ABSTRACT

Apparatus and methods in a near field communication capable electronic device are disclosed. An antenna receives a near field signal from a recharging pad or a reader to provide a reception signal. A detector coupled to the antenna receives the reception signal and detects therefrom a voltage, current or power value representing a power level of the near field signal. A switch is coupled to the detector, and switches the reception signal corresponding to the recharging pad or the reader to a recharging transceiver to recharge a battery, or to a near field communication transceiver, respectively, on the basis of the detected voltage. A Hall-effect type magnetic sensor may be used as an alternative to the detector.

18 Claims, 4 Drawing Sheets

APPARATUS AND METHOD FOR NON-CONTACT RECHARGING AND NEAR FIELD COMMUNICATION IN A PORTABLE ELECTRONIC DEVICE

CLAIM OF PRIORITY

This application claims priority under 35 U.S.C. §119(a) to a Korean Patent Application filed in the Korean Intellectual Property Office on Aug. 18, 2011 and assigned Serial No. 10-2011-0082050, the contents of which are herein incorporated by reference.

BACKGROUND

1. Technical Field

The present disclosure relates generally to non-contact (wireless) recharging and near field communication in a portable electronic device.

2. Description of the Related Art

Various near field communication methods such as RFID (Radio Frequency Identification), NFC (Near Field Communication), etc. as well as non-contact recharging methods such as a resonance method comprising electromagnetic induction, etc. have been introduced to mobile (i.e., portable) terminals, as mobile terminal functionality has improved rapidly.

Herein, when referring to recharging, the terms "non-contact" recharging and "wireless" recharging will be used interchangeably and refer to a connection without wires between a recharging power source and an electronic device that includes a battery to be recharged. Herein, NFC refers to near field communication between devices in close proximity, which may be communication in accordance with either the NFC protocol or other near field communication protocols such as Bluetooth.

RFID is a field of automatic identification that utilizes bar-codes, magnetic strips, etc. to store identifying information of an article. RFID is referred to as a radio frequency identifying system recognizing written information in a wireless method using LF, UF, or UHF frequency bands for close range communication, or microwave frequencies for longer ranges. The principle of RFID is to receive information stored in a tag through an antenna, while a reader recognizes and analyzes the information for obtaining identifying information of an article with the tag.

The NFC protocol is a near field wireless communication protocol to transmit data with low power within a distance of 10 cm using frequency of 13.56 MHz band; it is classified as a field of RFID and the standard is defined in ISO 18092.

NFC allows transmission and reception of data between information devices and has an advantage that a file such as an address book file, a game file, MP3 file, etc. can be transmitted and received between mobile terminals or from a note book to a mobile terminal RFID technology of 13.56 MHz (HF band) has high stability and has been used presently for mobile payment means such as a transportation card, etc. and may be utilized as an information terminal for obtaining various information in the future by accessing tag storing information. As above-mentioned, NFC terminals are in an early stage of adoption and the wide adaptation to a mobile terminal henceforward, etc. is predicted.

Another area of recent technological advancement is wireless recharging, which is also referred to as no contact point recharging or non-contact recharging. Wireless recharging power may be transmitted from a power source to a target device in a wireless manner within several millimeters and it is possible to recharge the target device automatically by simply placing it on a recharging pad.

A non-contact power source supplying module enhances the convenience of power supply for portable devices, by enabling the batteries of the devices to be recharged without electrical connection of the device using connection pins and wires to a power adapter. The time to connect a physical adapter is thereby saved, as well as the cost of replacing adapter cables as they wear out. Portable terminals using a rechargeable battery include mobile terminals, MP3 players, notebook computers, digital cameras, etc. Also, it is possible to pursue a variety of functions by supplying power to non-source devices such an electronic shoe game (a game with a card dispensing shoe) or electronic board game in a non-contact manner.

As above-mentioned, the desire for consumers to use mobile terminals with improved functions and with the latest technology is never ending. Thus it is predicted that the demand for portable terminals equipped with both near field wireless communication and non-contact recharging capability will rise in the near future.

However, there remains a trend and desire for portable terminals to be slim and compact, and to be manufactured at a low cost. Therefore, any improvements in functionality, such as by adding NFC and wireless charging electronics, should be accomplished by adding as little extra size, weight and complexity to current devices as possible.

SUMMARY

The present disclosure provides an apparatus and a method in an electronic device for receiving a near field signal from a recharging pad or from a NFC device/reader. When the near field signal corresponds to the recharging pad, it is switched to a non-contact recharging transceiver in the electronic device. When the near field signal corresponds to the NFC device/reader, it is switched to a NFC transceiver within the electronic device.

Exemplary embodiments of apparatus and methods in a near field communication capable electronic device are disclosed herein. An antenna receives a near field signal from a recharging pad or a reader to provide a reception signal. A detector coupled to the antenna receives the reception signal and detects therefrom a voltage, current or power value representing a power level of the near field signal. A switch is coupled to the detector, and switches the reception signal corresponding to the recharging pad or the reader to a recharging transceiver to recharge a battery, or to a near field communication transceiver, respectively, on the basis of the detected voltage. A Hall-effect type magnetic sensor may be used as an alternative to the detector.

Advantages of certain embodiments of the invention include a more compact design for the electronic device, and reduced manufacturing cost by integrating a NFC antenna with a coil used for non-contact recharging.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

Exemplary embodiments of the present invention will be described herein below with reference to the accompanying drawings. In the following description, well-known functions or constructions are not described in detail since they would obscure the invention in unnecessary detail. Also, the terms used herein are defined according to the functions of the present invention. The meaning of terms may vary according to the user, the intention of the operator, usual practice, etc. Therefore, the meanings of terms used in this disclosure are intended to be construed in accordance with any definitions herein and to be consistent with the description herein set forth.

Figure 1:
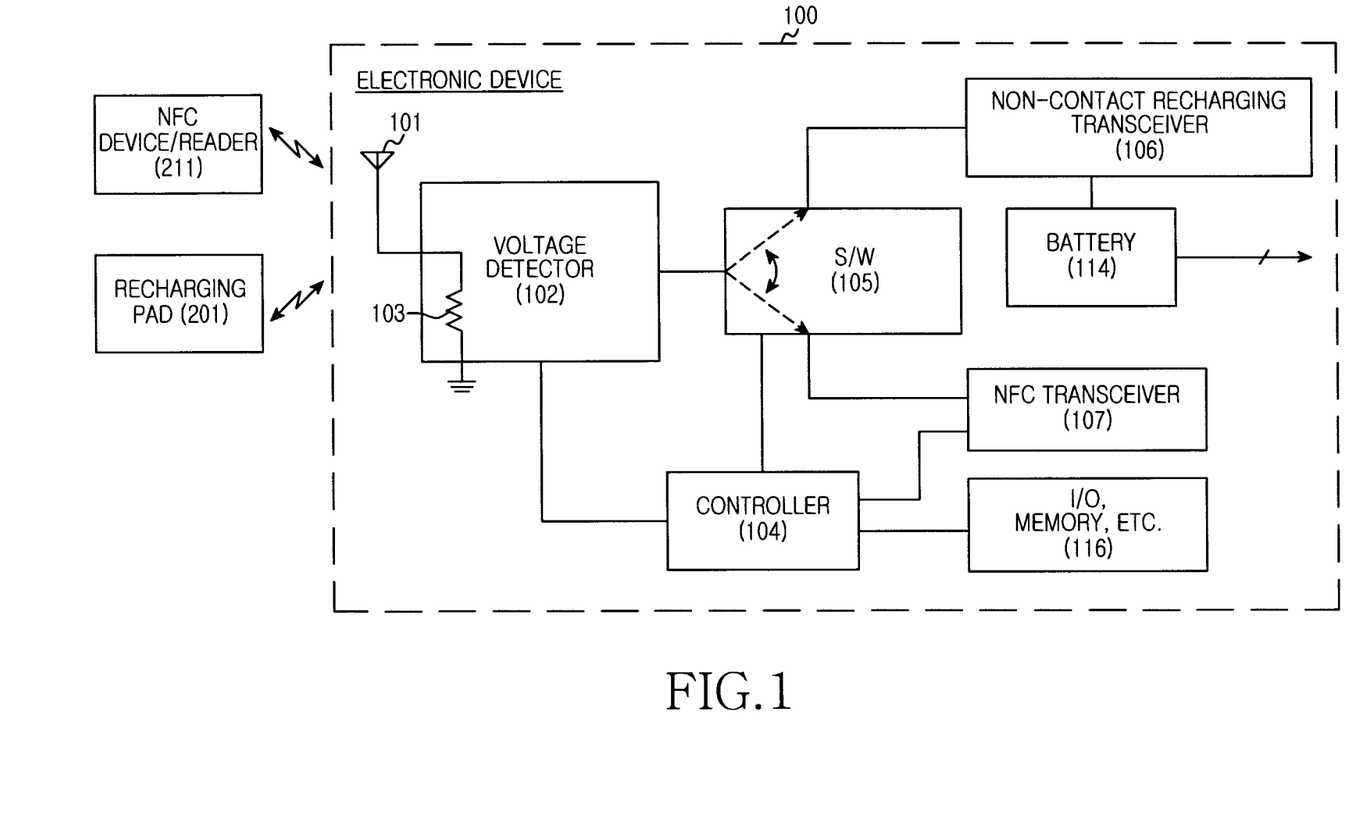
FIG. 1 is a functional block diagram of an embodiment of an electronic device in accordance with the present invention.

FIG. 1 is a functional block diagram of an electronic device, 100, according to an embodiment of the present invention. Electronic device 100 may be, for example, a portable terminal such as a smart phone or tablet computer, a notebook computer, a portable music player, a PDA (personal digital assistant), and so forth. As will be explained, electronic device 100 includes components constituting an apparatus for discriminating an input near field signal as being either a power signal to recharge a battery, or as a near field communication (NFC) signal. On the basis of the discrimination, the input signal is routed to a non-contact recharging transceiver 106 to recharge a battery 114 connected thereto, or to a NFC transceiver 107 to receive a near field data communication.

In the shown embodiment, the apparatus for discriminating the input near field signal includes an antenna 101, a voltage detector 102, a resistor 103, a controller 104, a switch 105, the non-contact recharging transceiver 106 and the NFC transceiver 107.

The antenna 101 receives a signal from a recharging pad 201 acting as a power source when electronic device 100 is placed on or near it. More specifically, when electronic device 100 is placed on the recharging pad 201 for non-contact recharging, the antenna 101 receives a signal generated at the recharging pad 201 due to inductive coupling or resonant inductive coupling between recharging pad 201 and antenna 101. The antenna 101 may be a NFC antenna integrated with non-contact recharging coil. The received signal provided by the antenna will be referred to herein as a reception signal.

When electronic device 100 is not placed on recharging pad 201, if another NFC capable device or reader 211 is in proximity to electronic device 100 and outputs a signal, antenna 101 receives that signal. Typically, a user of electronic device 100 does not attempt simultaneous recharging and near field communication with another device 211; however, if this is attempted in this embodiment, recharging will occur and NFC communication will not occur.

The voltage detector 102 is connected to the antenna 101 for receiving the signal from the antenna 101 (i.e., the reception signal) and measuring a voltage between the detector 102 and the antenna 101. More specifically, resistor 103 (which can be a variable resistor) is connected between antenna 101 and ground (resistor 103 can be installed within, or exterior to, the voltage detector 102). As antenna 101 receives the near field signal, current flows through resistor 103, producing a voltage across it. This voltage is measured by voltage detector 102 according to Ohms' law. The voltage measurement represents a measure of the electromagnetic power of the near field signal received by antenna 101 from either the recharging pad 201 or the NFC device/reader 211. It is noted here that as an alternative to measuring voltage with the voltage detector 102, a current detector or power detector may be used for measuring a current through resistor 103, or power dissipated by resistor 103, thereby obtaining an equivalent measure of the near field power received by antenna 101.

The controller 104 is connected to the voltage detector 102 and receives either the actual voltage measured at the voltage detector 102 or a signal representing the measured voltage (or an indication of current/power in the case of a current/power detector). In response to the voltage level received, controller 104 controls the position of the switch 105 connected thereto. More specifically, switch 105 is a single pole, multi throw switch (it is shown as a single pole double throw switch but may have one or more additional outputs). The input of switch 104 is connected to the output of voltage detector 102 to receive the reception signal provided by antenna 101 corresponding to the near field signal from the recharging pad or the NFC device/reader.

The position of switch 105 is controlled such that the switch 105 output is either in a first position connecting the switch input to non-contact recharging transceiver 106, or a second position connecting the switch input to NFC transceiver 107. The switch position is controlled by controller 104 in accordance with the measured voltage, current or power level provided to controller 104 by detector 102.

If the voltage value measured at the voltage detector 102 is equal to or greater than a predetermined first value, then the switch 105 position is moved to the direction where the non-contact recharging transceiver 106 is located. If the voltage value measured at the voltage detector 102 is less than a predetermined second value, then the switch 105 position is moved to the direction where the NFC transceiver is located. The measured voltage level expected from a near field signal provided by recharging pad 201 is significantly higher than the level expected from NFC device/reader 211. Therefore, the predetermined second value may be set either equal to the first value, or, it may be set substantially less than the first value. The predetermined first and second value may be set close to the highest value expected for a NFC/reader device, in order to prevent excessive voltage/current appearing at the input to NFC transceiver 107. Alternatively, switch 105 can be at least a single pole, triple throw switch, where a third output is provided and connected to a dissipating resistor, to handle values in between the maximum current/voltage/power value expected from a NFC device/reader, and the minimum expected from a recharging pad.

For instance, the expected current value flowing in the case of receiving a recharging pad signal and switch 105 being switched to the direction of the non-contact recharging transceiver 106 can be in the range of 500 mA to 1 A. However the expected current value flowing in the case of receiving a reader 211 signal and switch 105 being switched to the direction of the NFC transceiver 107 can be on the order of 1 mA or less. Therefore, with these types of currents, the predetermined first value can be set in a wide range between 1 mA and 500 mA and may be set equal to the second value (for example, a single threshold value may be set near a mid-way point between the expected currents, or closer to the 1 mA value to avoid too much power being applied to the NFC transceiver).

As mentioned, the input of switch 105 is connected to the voltage detector 102, a control input port of switch 105 is connected to controller 104, and the switch position is controlled by the controller 104. (Controller 104 is shown separately but it is conceivable that switch 105 itself or voltage detector 102 itself can include the control function of controller 104.) Controller 104 also controls the general operation of electronic device 100, communicating with and controlling device electronics 116 such as Input/Output electronics, memory, and so forth. It is noted here that with regard to antenna 101, any suitable configuration can be used to achieve the desired near field inductive type communication with recharging pad 201 and reader 211. Examples include inductive type coils and resonant inductive type coils, where the design is preferably consistent with the coil type design for recharging pad 201. If the switch 105 is moved to the direction where the non-contact recharging transceiver 106 is located, transceiver 106 receives the recharging pad power signal from antenna 101 (i.e., the reception signal) through voltage detector 102 and switch 105 and applies the received power to the battery 114 to recharge battery 114. The recharging of device 100 may thus be carried out automatically without the necessity of an electrical connector, merely by placing device 100 on or close to recharging pad 201 in a contact-less manner.

If the near field signal received by antenna 101 is low enough to cause the measured voltage to fall below the second threshold, this signifies that a NFC device/reader signal is input, and switch 105 is controlled to connect its output to NFC transceiver 107. NFC transceiver 107 thereby receives input data carried by the near field signal, whereby NFC type communication can occur. Examples include payment for goods/services, obtaining product information at a general store, tour guide information for visitors, traffic control (e.g., payment for tolls), and a locking device for access control systems, etc. It should be noted that a typical NFC enabled device has functionality of both a reader and a tag. When electronic device 100 operates in a tag mode, it outputs identifying information associated therewith to the external reader or NFC device 211. When operating in a reader mode, it receives information from NFC device 211. In any event, for brevity, NFC device/reader 211 will herein be referred to interchangeably as simply a "reader".

Figure 2:
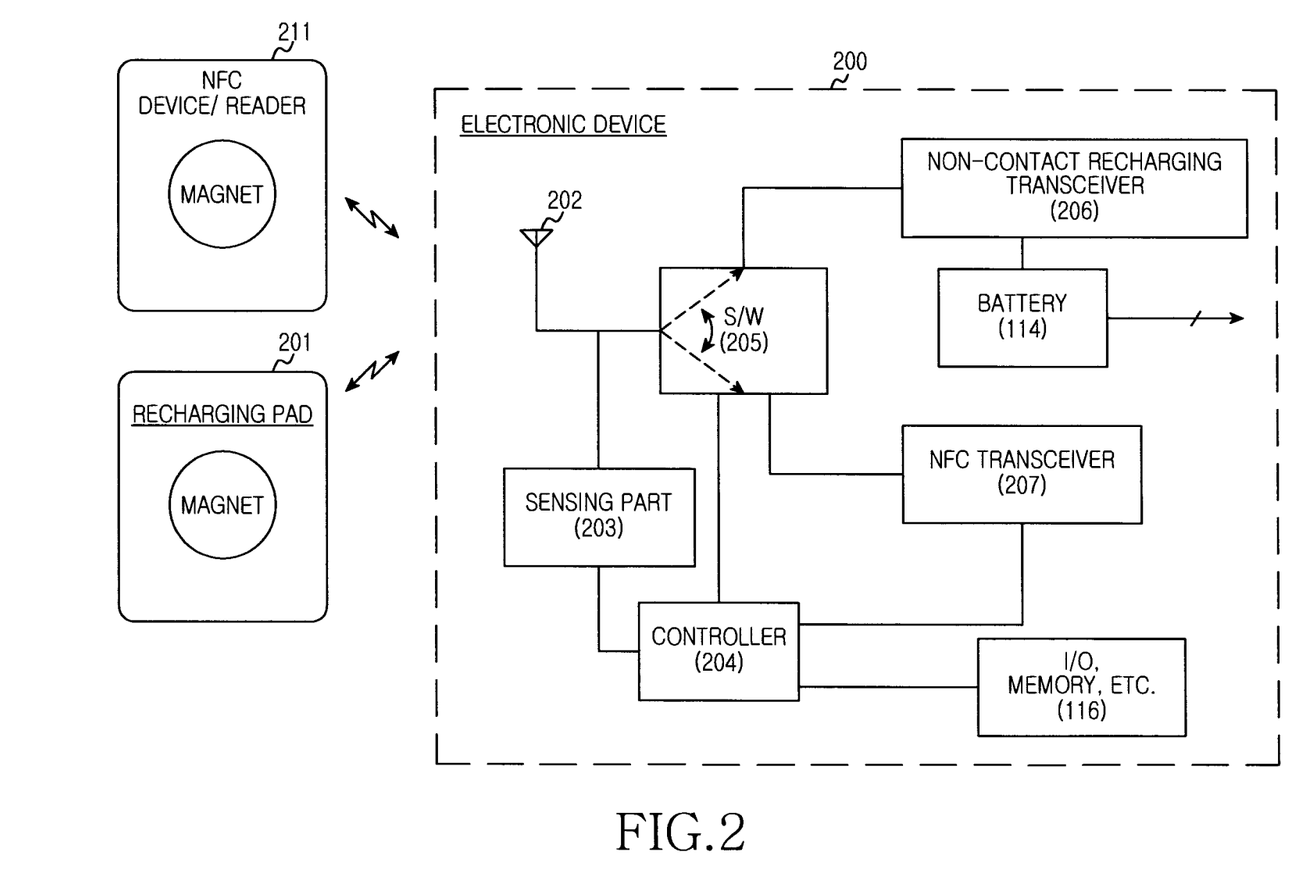
FIG. 2 is a functional block diagram of another embodiment of an electronic device the present invention.

FIG. 2 is a functional block diagram of an electronic device 200 according to another embodiment of the present invention. Electronic device 200 is essentially the same as electronic device 100 described in connection with FIG. 1, except that a sensing part 203 replaces the voltage detector 102 and resistor 103. Antenna 202, switch 205, controller 204, recharging transceiver 206 and NFC transceiver 207 perform the similar functions as the corresponding components of FIG. 1.

A magnet is embedded into a recharging pad 201 or a NFC device/reader 211. The antenna 202 may be a NFC antenna integrated with non-contact recharging coil.

The sensing part 203 is connected to antenna 202 and the controller 204. Sensing part 203 may comprise a Hall sensor or a MR sensor (Magneto-resistive Sensor). The Hall sensor operates based on the Hall Effect principal, i.e., if a conductor is placed between permanent magnets and a current flows through the conductor, a voltage change occurs due to a magnetic flux change generated between the permanent magnets. Sensing may then be made by measuring the voltage change.

The MR sensor uses a magneto-resistive effect element that detects a change of magnetic field or the existence of magnetic substance as a voltage change. The magneto-resistive effect refers to a phenomenon in which the electrical resistance of a solid substance changes depending on a magnetic field. Therefore, according to the above-mentioned principal, the sensing part 203 recognizes a value of magnetic field from a magnet embedded into the recharging pad 201 or the reader 211 to convert the value of magnetic field into a value of voltage.

The controller 204 may be connected to the sensing part 203 to receive the converted value of voltage from the sensing part 203 and move the switch 205 position connected to the controller 204. More specifically, the switch 205 position may be moved to the direction of the non-contact recharging transceiver 206 or the NFC transceiver 207. For example, if the converted voltage value of the sensing part 203 is equal to or greater than a predetermined value (or is within a first voltage range), then the switch 205 position is moved to the direction where the non-contact recharging transceiver is located, while if the voltage value measured at the sensing part 203 is less than the predetermined value (or within a second voltage range), then the switch 205 is moved to the direction where the NFC transceiver is located. Alternatively, different predetermined values can be used for the two conditions. The predetermined value may be a voltage value corresponding to a current value in the range of 1 mA to 500 mA.

Each function after being switched in one direction of the non-contact recharging transceiver 206 or the NFC transceiver 207 was explained in detail, referring to FIG. 1 and therefore the description of each function is omitted.

Figure 3:
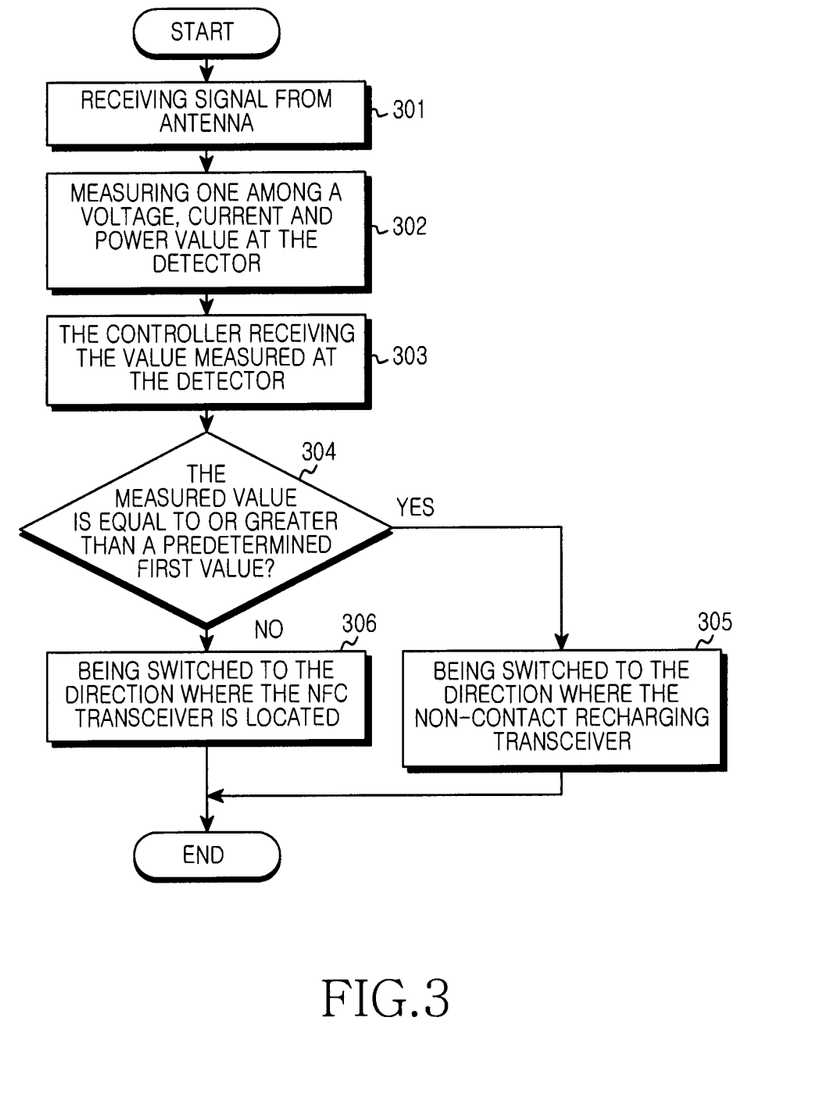
FIG. 3 is a flowchart illustrating an exemplary method for discriminating a near field input signal as a battery recharging signal or a NFC signal, which method can be performed by electronic device of FIG. 1.

FIG. 3 is a flowchart illustrating an exemplary method for discriminating a near field input signal as a battery recharging signal or a NFC signal, which method can be performed by electronic device 100 of FIG. 1. As shown in FIG. 3, a signal is received from a recharging pad or a reader through an antenna (step 301). A detector connected to the antenna receives the signal from the antenna and detects a value representing the power level of the near field input signal. This value is selected from a group consisting of a voltage, a current or a power value between the detector and the antenna (step 302), depending on the whether a voltage, current or power detector is used within electronic device 100 as described earlier.

The controller connected to the detector receives the value measured at the detector (step 303). The controller then determines whether the measured value received from the detector is equal to or greater than a predetermined first value (step 304). If the measured value is equal to or greater than the predetermined first value, the position of the switch connected to the controller is moved to the direction where the non-contact transceiver is located (step 305) and the process for non-contact recharging is carried out.

In step 304, if the measured valued is neither equal to nor greater than the predetermined first value (that is, less than the predetermined first value), the position of the switch connected to the controller is moved to the direction where the NFC transceiver is located (step 306) and a process for near field wireless communication is carried out.

Figure 4:
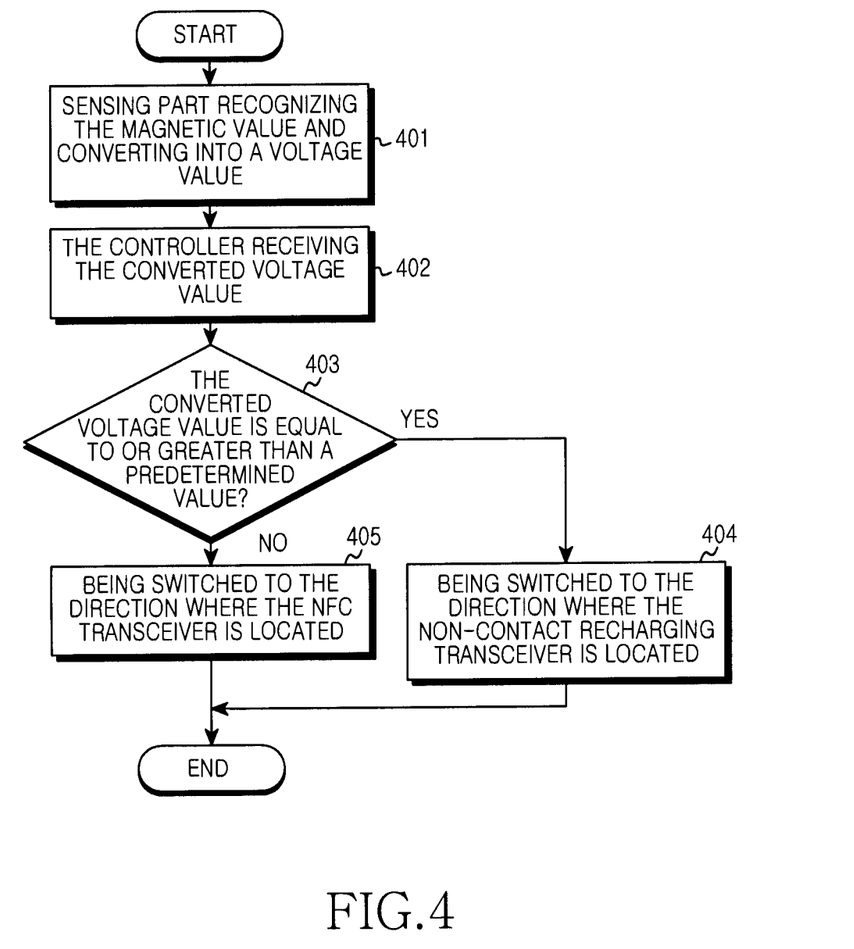
FIG. 4 is a flowchart illustrating an exemplary method for discriminating a near field input signal as a battery recharging signal or a NFC signal, which method can be performed by electronic device of FIG. 2.

FIG. 4 is a flowchart illustrating an exemplary method for discriminating a near field input signal as a battery recharging signal or an NFC signal, which method can be performed by the electronic device 200 of FIG. 2. As shown in FIG. 4, the sensing part recognizes a value of magnetic field from a magnet embedded in the recharging pad or the reader and converts the value of the magnetic field into a voltage value (step 401). The controller connected to the sensing part receives the converted voltage value from the sensing part (step 402), and determines whether the converted value is equal to or greater than a predetermined value (step 403).

In step 403, if the converted value is equal to or greater than the predetermined voltage value, the position of the switch connected to the controller is moved to the direction where the non-contact recharging transceiver is located (step 404) and a process for non-contact recharging is carried out. The predetermined value may be a voltage value corresponding to a current value in the range of 1 mA to 500 mA.

In step 403, if the converted voltage value is equal to or less than the predetermined value, the switch connected to the controller is moved to the direction where the NFC transceiver is located (step 405) and a process for near field wireless communication is carried out. As mentioned earlier, as an alternative to using a single predetermined value for both cases, first and second predetermined values can be used. In this case, if measured values fall in between the first and second values, the input signal could be applied to a terminating resistor connected to a third output port of the switch 205.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. An apparatus in a near field communication capable electronic device, the apparatus comprising:
   an antenna to receive a near field signal from a recharging pad or a reader to provide a reception signal;
   a detector coupled to the antenna to receive the reception signal and detect therefrom a voltage, current or power value representing a power level of the near field signal; and
   a switch coupled to the detector, to switch the reception signal corresponding to the recharging pad or the reader to a recharging transceiver to recharge a battery, or to a near field communication transceiver, respectively, on the basis of the detected voltage, current or power value.

2. The apparatus of claim 1, further comprising a controller coupled to the detector and the switch, the controller configured to receive the detected voltage, current or power value from the detector and to control a switch position of the switch on the basis of the detected value.

3. The apparatus of claim 1, wherein if the detected voltage, current or power value is greater than a predetermined first value, the switch switches the reception signal to the recharging transceiver, and if the detected value is less than a predetermined second value, the switch switches the reception signal to the near field communication transceiver.

4. The apparatus of claim 3, wherein the detected value is a current value, and the predetermined first and second values are each in the range of 1 mA to 500 mA.

5. The apparatus of claim 1, further comprising a resistor coupled between the antenna and ground, and the detector detects the voltage, current or power value as a measure of the voltage across, current through, or power dissipated by, the resistor, respectively.

6. The apparatus of claim 1, wherein the reception signal switched by the switch is the reception signal provided by the antenna after passing through the detector.

7. An apparatus in a near field communication capable device, the apparatus comprising:
   a sensing part for recognizing a magnetic field value from a magnet embedded into a recharging pad or a reader and converting the magnetic field value into a voltage value; and
   a switch coupled to the sensing part, to switch a reception signal corresponding the recharging pad or the reader to a recharging transceiver to recharge a battery, or a near field communication transceiver, respectively, on the basis of the voltage value.

8. The apparatus of claim 7, further comprising a controller coupled to the sensing part and the switch, the controller configured to receive the detected voltage value from the sensing part and to control a switch position of the switch on the basis of the detected value.

9. The apparatus of claim 8, further comprising a near field antenna to receive the reception signal from one of the recharging pad and the reader and to provide the reception signal to the switch.

10. The apparatus of claim 7, wherein if the voltage received from the sensing part is equal to or greater than a predetermined value, the switch is moved to the direction where the non-contact recharging transceiver is located, and if the voltage received from the sensing part is less than the predetermined value, then the switch is moved to the direction where the near field communication transceiver is located.

11. The apparatus of claim 10, wherein the predetermined value is a voltage value corresponding to a current value in the range of 1 mA to 500 mA.

12. A method operative in an electronic device capable of near field communication, the method comprising:
   receiving a near field signal transmitted from a recharging pad or a reader through an antenna to provide a reception signal;
   detecting a voltage, current or power level of the reception signal, representing a power level of the near field signal; and
   switching the reception signal corresponding to the recharging pad or the reader, to a recharging transceiver or a near field communication transceiver, respectively, on the basis of the detected voltage, current or power level.

13. The method of claim 12, wherein the reception signal is switched to the recharging transceiver if the detected voltage, current or power level is above a first predetermined value, and the reception signal is switched to the near field communication transceiver if the detected voltage, current or power level is below a second predetermined threshold.

14. The method of claim 13, wherein current is detected, and the first and second predetermined values are each in the range of 1 mA to 500 mA.

15. The method of claim 12, wherein the detected voltage, current or power is respectively measured across, through, or dissipated in, a resistor coupled between an antenna and ground.

16. A method operative in an electronic device capable of near field communication, the method comprising:
   recognizing a magnetic field value from a magnet embedded into a recharging pad or a reader, and converting the magnetic field value into a voltage value; and
   switching a reception signal corresponding to the recharging pad or the reader to a recharging transceiver to recharge a battery, or to a near field communication transceiver, respectively, on the basis of the voltage value.

17. The method of claim 16, wherein if the voltage value is equal to or greater than a predetermined value, the reception signal is switched to the recharging transceiver, and if the voltage value is less than the predetermined value, the reception signal is switched to the near field communication transceiver.

18. The method of claim 17, wherein the predetermined value is a voltage value corresponding to a current value in the range of 1 mA to 500 mA.

* * * * *

UNITED STATES PATENT AND TRADEMARK OFFICE
CERTIFICATE OF CORRECTION

PATENT NO. : 8,957,633 B2
APPLICATION NO. : 13/588471
DATED : February 17, 2015
INVENTOR(S) : Jun Yoon

Page 1 of 1

It is certified that error appears in the above-identified patent and that said Letters Patent is hereby corrected as shown below:

In the Claims

Column 8, Claim 7, Line 27 should read as follows:
--...corresponding to the recharging...--

Signed and Sealed this
Twenty-sixth Day of May, 2015

Michelle K. Lee
*Director of the United States Patent and Trademark Office*